(12) United States Patent
Förg et al.

(10) Patent No.: US 12,152,384 B2
(45) Date of Patent: Nov. 26, 2024

(54) SEALING PROFILE AND METHOD FOR PRODUCING A PLURALITY OF SEALING PROFILES

(71) Applicant: Hilti Aktiengesellschaft, Schaan (LI)

(72) Inventors: Christian Förg, Buchloe (DE); Manfred Klein, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/042,767

(22) PCT Filed: Aug. 20, 2021

(86) PCT No.: PCT/EP2021/073166
§ 371 (c)(1),
(2) Date: Feb. 23, 2023

(87) PCT Pub. No.: WO2022/043221
PCT Pub. Date: Mar. 3, 2022

(65) Prior Publication Data
US 2023/0330982 A1 Oct. 19, 2023

(30) Foreign Application Priority Data

Aug. 24, 2020 (EP) ..................... 20192382
Mar. 15, 2021 (EP) ..................... 21162520
Mar. 15, 2021 (EP) ..................... 21162522

(51) Int. Cl.
*E04B 1/68* (2006.01)
*B32B 5/18* (2006.01)
(Continued)

(52) U.S. Cl.
CPC .............. *E04B 1/6812* (2013.01); *B32B 5/18* (2013.01); *B32B 27/065* (2013.01);
(Continued)

(58) Field of Classification Search
CPC ........ E04B 1/6812; E04B 1/947; E04B 1/948; B32B 5/18; B32B 27/065; B32B 38/0004;
(Continued)

(56) References Cited

U.S. PATENT DOCUMENTS

| | | | |
|---|---|---|---|
| 3,491,510 A | * | 1/1970 | Sternau ............. B29C 66/24244 53/329.2 |
| 9,938,109 B2 | | 4/2018 | Deiss |
| 2016/0060068 A1 | | 3/2016 | Deiss |

FOREIGN PATENT DOCUMENTS

| | | |
|---|---|---|
| DE | 20306687 U1 | 9/2004 |
| EP | 2423396 | 2/2012 |
| EP | 2990553 | 3/2016 |

OTHER PUBLICATIONS

International Search Report dated Dec. 3, 2021, in PCT/EP2021/073166, with English translation, 5 pages.
Written Opinion dated Dec. 3, 2021, in PCT/EP2021/073166, with English translation, 12 pages.
Förg et al., U.S. Appl. No. 18/041,664, filed Feb. 14, 2023.
Förg et al., U.S. Appl. No. 18/041,675, filed Feb. 14, 2023.
Förg et al., U.S. Appl. No. 18/042,467, filed Feb. 22, 2023.
Förg et al., U.S. Appl. No. 18/042,480, filed Feb. 22, 2023.
Förg et al., U.S. Appl. No. 18/042,498, filed Feb. 22, 2023.
Förg et al., U.S. Appl. No. 18/042,634, filed Feb. 23, 2023.
(Continued)

*Primary Examiner* — Gilbert Y Lee
(74) *Attorney, Agent, or Firm* — Grüneberg and Myers PLLC

(57) ABSTRACT

A method can be used for producing a plurality of sealing profiles for an edge joint of drywall. The method involves providing a first web of sealing material, and applying a plurality of adhesive strips to the first web, where adjacent adhesive strips are at a distance from one another corresponding to at least 50% of the height of a sealing profile. The method then involves providing a second web, and merging and joining the first web to the second web via the adhesive strips to form a multilayer web. The method further involves introducing a plurality of cuts in a particular way at a distance from all adhesive strips to form a number of sealing profiles. A corresponding sealing profile is produced in this way.

14 Claims, 3 Drawing Sheets

(51) Int. Cl.
    *B32B 27/06*        (2006.01)
    *B32B 38/00*        (2006.01)
    *E04B 2/74*         (2006.01)
    *E04B 1/94*         (2006.01)
(52) U.S. Cl.
    CPC ........ *B32B 38/0004* (2013.01); *E04B 2/7409*
            (2013.01); *B32B 2266/06* (2013.01); *B32B
            2581/00* (2013.01); *E04B 1/947* (2013.01);
                                    *E04B 1/948* (2013.01)
(58) Field of Classification Search
    CPC .. B32B 2266/06; B32B 2581/00; F16J 15/02;
            F16J 15/04; F16J 15/10; F16J 15/102
    See application file for complete search history.

(56) References Cited

OTHER PUBLICATIONS

U.S. Appl. No. 18/041,664, filed Feb. 14, 2023, Förg et al.
U.S. Appl. No. 18/042,498, filed Feb. 22, 2023, Förg et al.
U.S. Appl. No. 18/041,675, filed Feb. 14, 2023, Förg et al.
U.S. Appl. No. 18/042,634, filed Feb. 23, 2023, Förg et al.
U.S. Appl. No. 18/042,480, filed Feb. 22, 2023, Förg et al.
U.S. Appl. No. 18/042,467, filed Feb. 22, 2023, Förg et al.

* cited by examiner

SEALING PROFILE AND METHOD FOR PRODUCING A PLURALITY OF SEALING PROFILES

CROSS-REFERENCE TO RELATED APPLICATIONS

This application is the National Stage entry under § 371 of International Application No. PCT/EP2021/073166, filed on Aug. 20, 2021, and which claims the benefit of priority to European Application No. 20192382.8, filed on Aug. 24, 2020, priority to European Application No. 21162520.7, filed on Mar. 15, 2021, and priority to European Application No. 21162522.3, filed on Mar. 15, 2021. The content of each of these applications is hereby incorporated by reference in its entirety.

BACKGROUND OF THE INVENTION

Field of the Invention

The invention relates to a method for producing a plurality of strip-shaped sealing profiles for an edge joint, which edge joint is formed between a floor and adjacent cladding of drywall. The invention also relates to a sealing profile which is produced using such a method.

Description of Related Art

Edge joints, in particular floor joints, are designed to provide sound decoupling of the drywall from adjacent walls, ceilings, or floors, in particular floorings.

The wall surfaces of the drywalls are formed by cladding parts such as gypsum boards, which often have to be protected from moisture. The edge joints therefore also form a barrier that protects the cladding parts against rising moisture, for example in the event of a pipe burst.

The edge joints are often sealed with sealing profiles that can be assembled with little effort, provide a sound and fire protection function, and reliably seal the joint against air and odors. Such sealing profiles often have a complex structure with sealing portions and fastening portions made of different materials.

The production process of such sealing profiles is complex and usually comprises a plurality of method steps in which parts of the sealing profile are extruded and then connected to one another.

SUMMARY OF THE INVENTION

The object of the invention is to provide a method by means of which a plurality of sealing profiles with a complex structure can be produced with particularly little effort. It is also an object of the invention to provide a sealing profile which is produced particularly efficiently in this way.

To achieve the object, a method for producing a plurality of sealing profiles for an edge joint is provided, which edge joint is formed between a floor and adjacent cladding of drywall. The method comprises the following steps:
 a) providing a first web of sealing material,
 b) applying a plurality of adhesive strips to the first web, wherein the adhesive strips each extend in a first direction of the web and adjacent adhesive strips of two adjacent sealing profiles are at a distance from one another in a second direction perpendicular to the first direction, which distance corresponds to at least 50% of the height of a sealing profile,
 c) providing a second web,
 d) merging and joining the first web with the second web via the adhesive strips to form a multilayer web, and
 e) introducing a plurality of vertical cuts in the first direction in the multilayer web at a distance from all adhesive strips to form a number of sealing profiles, wherein each cut separates two sealing profiles from one another, wherein each cut is at the smallest distance from the adhesive strip of one of its assigned sealing profiles, which distance corresponds to at most 20% of the height of the sealing profile, and is at the smallest distance from the adjacent adhesive strip of the other of its assigned sealing profiles, which distance corresponds to at least 50% of the height of the sealing profile perpendicular to the first direction. The sealing profiles each form a sealing profile or a sealing profile blank, i.e. an intermediate product of a sealing profile.

According to the invention, it was recognized that in this way a plurality of sealing profiles can be produced with little effort, which have a complex structure.

The sealing profiles each have a base body for sealing the edge joint and a fastening portion which is attached to the base body via at least one adhesive strip.

Due to the way in which the adhesive strips and cuts are applied or introduced during the production method, the base bodies are only connected to the fastening portion on one side, for example at the bottom, while an upper portion of the base body is not fastened laterally to the fastening portion. As a result, the upper portion can be resiliently deformed or compressed particularly strongly in the vertical direction. In this way, in the installed state, the sealing profile adapts to the joint width of the edge joint over a particularly large vertical region and thus seals it off effectively. The fastening portion also ensures a defined and reliable fastening of the sealing profile to a holding rail of the drywall, so that assembly can be carried out with little effort.

DETAILED DESCRIPTION OF THE INVENTION

Figure 1:
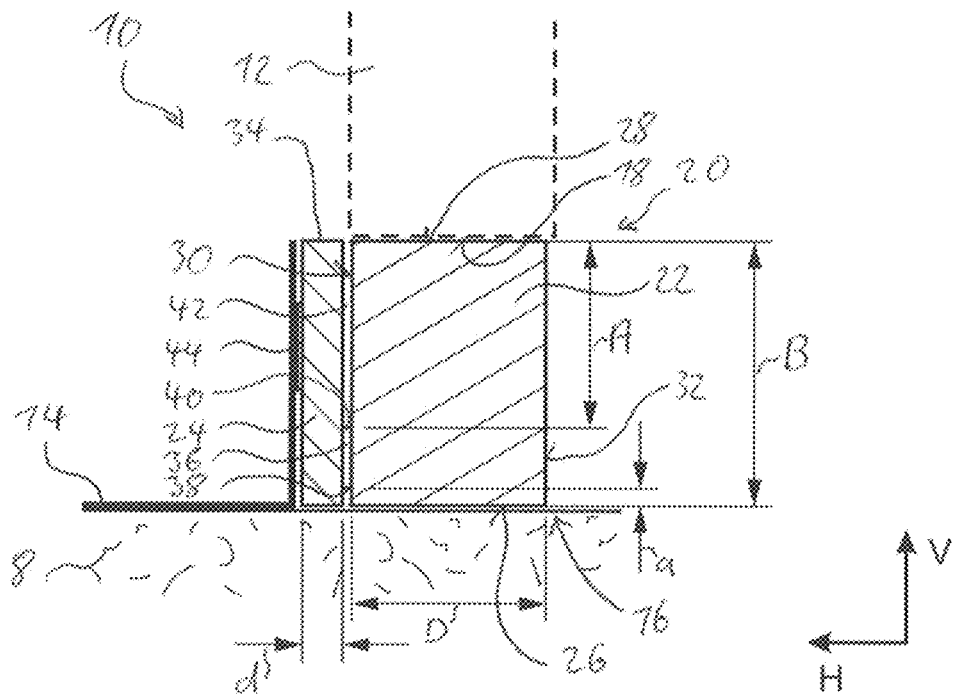
FIG. 1 is a schematic sectional view of a sealing profile according to the invention.

In one embodiment, the following step is carried out before step e):
 f) applying a plurality of assembly aid strips to the second web, wherein the assembly aid strips are arranged opposite to the first web and each extend in the first direction of the second web, wherein each adhesive strip is assigned an assembly aid strip.

By means of the assembly aid strips, the sealing profiles can be reliably assembled with little effort in particular on a holding rail of the drywall. The application of a plurality of assembly aid strips has the advantage that the width of the assembly aid strip can be smaller than the width of the sealing profile or the height of the sealing profile.

Alternatively, the following step can be carried out before step e):

g) applying an assembly aid layer to the second web, wherein the assembly aid layer is arranged opposite to the first web and, after introducing a plurality of vertical cuts in step e), forms a plurality of assembly aid strips, each of which extend in the first direction of the second web and are assigned to one of the sealing profiles.

This step has the advantage that the assembly aid strips of the sealing profiles are applied in a coherent layer and are only divided up afterwards.

Furthermore, the following step can be carried out after step d):

h) introducing a plurality of vertical cuts in the first direction in the first web to form sealing profiles with a stepped profile.

In this way, sealing profiles with portions of different heights can be produced with little effort in order to provide correspondingly differentiated sealing functions.

In a further embodiment, in step h) the plurality of vertical cuts extends completely in the vertical direction through the first web, but not in or through the second web. Thus, the portion of the sealing profile that is formed by the first web has a different height than the portion of the sealing profile that is formed by the second web.

It can be provided that step h) is carried out before or together with step e), i.e. at a point in time at which the sealing profiles are still connected to one another and thus cuts can be made in a defined manner with little effort.

It is advantageous if the first web and/or the second web is roll goods, since roll goods can be produced particularly inexpensively and in great lengths.

According to one embodiment, the sealing material of the first web is a foam, in particular an open-cell or at least partially open-cell foam, which is particularly flexible.

According to a further embodiment, the second web is formed from a plastics material or a foam, in particular from a closed-cell foam, in order to provide high strength and/or resistance.

Furthermore, it can be provided that each sealing profile has exactly one adhesive strip. As a result, the connection between the portion of the first web and the portion of the second web can be designed particularly narrow.

In one embodiment, the webs used are plate-shaped with a constant thickness in order to ensure sealing profiles with defined and constant dimensions.

In a further embodiment, the first web has a thickness that is at least 3 times greater than that of the second web. Thus, the portion made of the sealing material is designed particularly wide compared to the portion made of the second web and ensures an effective sealing of the edge joint.

According to the invention, a sealing profile is also provided to achieve the above-mentioned object, which was produced by the method according to the invention with the advantages mentioned above.

Figure 2:
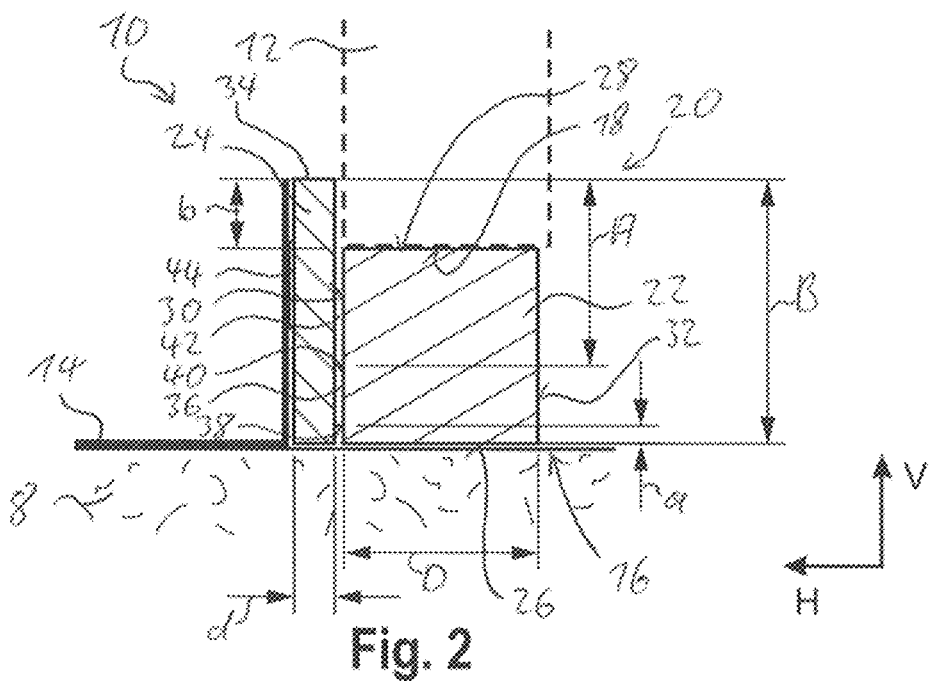
FIG. 2 is a schematic sectional view of a sealing profile according to the invention in accordance with a further embodiment.
Figure 3:
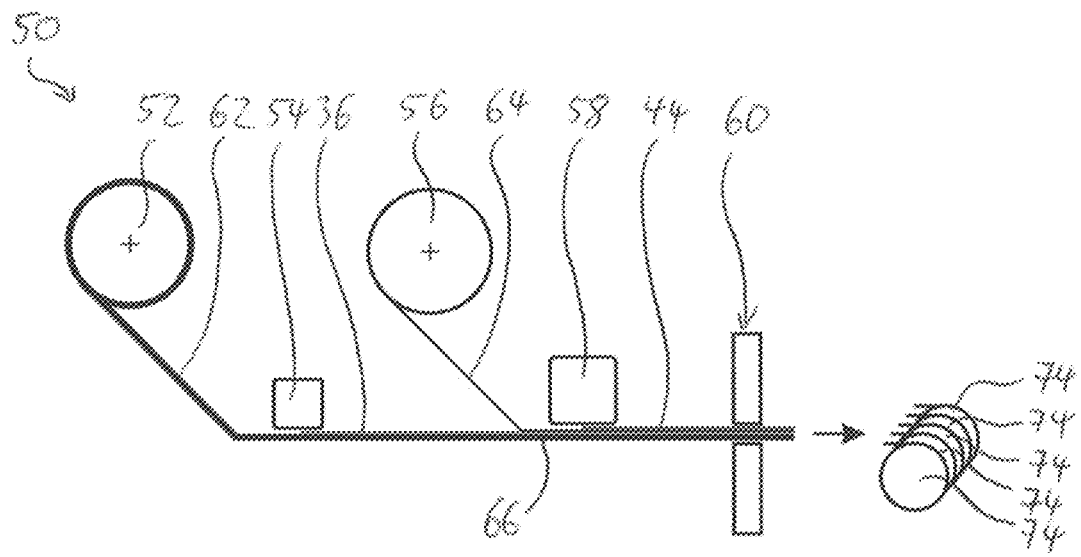
FIG. 3 is a schematic view of a production line in which sealing profiles according to the invention are produced in accordance with a method according to the invention.
Figure 4:
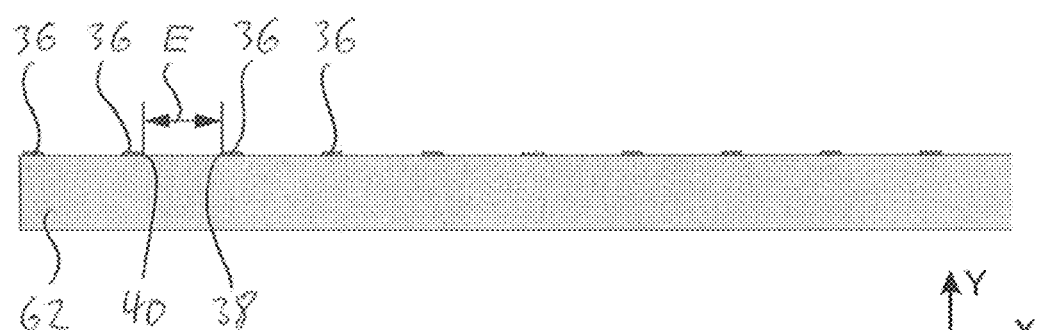
FIG. 4 is a schematic sectional view of an individual step of the method from FIG. 3.
Figure 5:
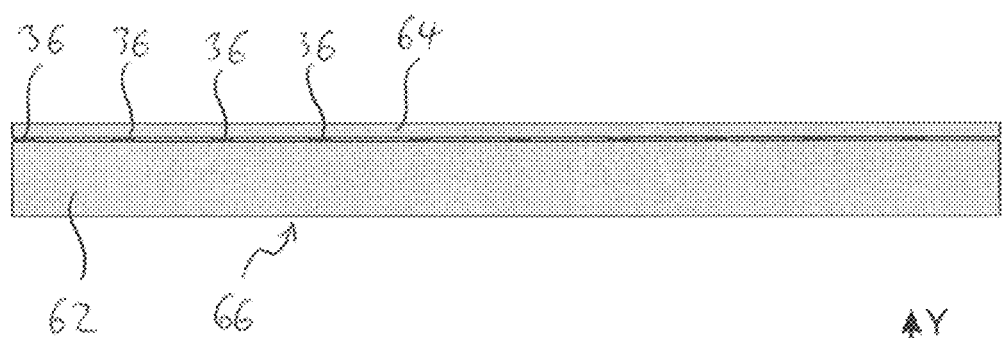
FIG. 5 is a schematic sectional view of an individual step of the method from FIG. 3.
Figure 6:
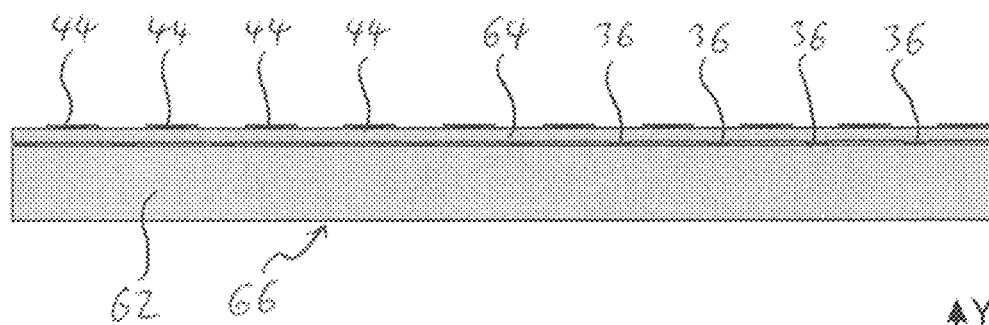
FIG. 6 is a schematic sectional view of an individual step of the method from FIG. 3.

Further advantages and features emerge from the following description and from the accompanying drawings. In the drawings:

FIG. 1 is a schematic sectional view of a sealing profile according to the invention, FIG. 2 is a schematic sectional view of a sealing profile according to the invention in accordance with a further embodiment, FIG. 3 is a schematic view of a production line in which sealing profiles according to the invention are produced in accordance with a method according to the invention, and FIGS. 4 to 8 are in each case a schematic sectional view of individual steps of the method from FIG. 3.

FIG. 1 is a cross section of drywall 10 with cladding 12 (gypsum wall) and a holding rail 14, which is part of a stand construction of the drywall 10. An edge joint 16 in the form of a floor joint, which is sealed by a sealing profile 20, is formed between a circumferential side 18 of the cladding 12 and the floor 8. FIG. 1 shows the drywall 10 in a not completely assembled state, in which the cladding 12 has not yet been installed and is therefore not yet bearing against the sealing profile 20. The cladding 12 is therefore only shown in dashed lines to illustrate its position.

The sealing profile 20 has a base body 22, which forms a sealing portion between the circumferential side 18 of the cladding 12 and the floor 8, and a fastening portion 24, which is arranged between the base body 22 and the holding rail 14.

The base body 22 has a rectangular cross section with an underside 26 facing the floor 8, an upper side 28 facing the cladding 12, against which upper side the cladding 12 rests with the circumferential side 18 in the assembled state, an inner side 30 opposite to the fastening portion 24, and an outer side 32 opposite to the inner side 30.

The fastening portion 24 has a rectangular cross section and extends in the vertical direction V up to an end 34 facing away from the floor 8, which in the unassembled state ends at the same vertical height as the upper side 28 of the base body 22.

In the embodiment shown in FIG. 1, both the base body 22 and the fastening portion 24 thus have the same vertical height B.

In the horizontal direction H, the base body 22 has a thickness D which is approximately 400% of the thickness d of the fastening portion 24.

Of course, the base body 22 can have a thickness D of any size. The thickness D of the base body 22 is preferably at least 300% of the thickness d of the fastening portion 24.

In principle, it is an advantage if the base body 22 has a thickness D which corresponds to the corresponding thickness of the cladding 12 so as to seal the sealing edge joint 16 over the entire depth.

The base body 22 consists of a sealing material made of open-cell foam, for example a foam based on PE, XPE, or EPDM.

In an alternative embodiment, the base body 22 consists at least partially of open-cell foam.

The fastening portion 24 consists of a closed-cell foam.

In an alternative embodiment, the fastening portion 24 can be formed of a plastics material, for example EPDM, PVC, foam rubber, thermoplastic elastomer, or silicone.

The sealing material of the base body 22 and the material of the fastening portion 24 are in each case roll goods.

In principle, the base body 22 and the fastening portion 24 can each be formed from any desired material or sealing material.

The base body 22 is connected to the fastening portion 24 via an adhesive strip 36 of the sealing profile 20, which extends from a lower end 38 at the bottom to an opposite upper end 40.

Of course, the adhesive strip 36 may not be continuous but may rather be interrupted in the vertical direction V and/or in the direction of extent of the profile. In other words, the adhesive strip 36 can consist of a plurality of strip portions that are adjacent in the vertical direction V and/or in the direction of extent of the profile.

Preferably, however, the adhesive strip 36 is a single strip, in particular with a constant width in the vertical direction V.

The adhesive strip 36 is arranged at the bottom.

Specifically, this means that the lower end 38 of the adhesive strip 36 is at a distance a in the vertical direction V from the underside 26 of the base body 22, which distance corresponds to approximately 5% of the height B of the base body 22.

Furthermore, the upper end 40 of the adhesive strip 36 is at a distance A in the vertical direction V to the end 34 of the fastening portion 24, which distance corresponds to approximately 75% of the height B of the base body 22.

In an alternative embodiment, the distance a is a maximum of 20%, in particular a maximum of 10% of the height B.

Additionally or alternatively, the distance A can be at least 50%, in particular at least 60% of the height B in an alternative embodiment.

The base body 22 is connected to the fastening portion 24 exclusively via the adhesive strip 36.

In the embodiment shown, the inner side 30 is separated from the fastening portion 24 by a vertical gap 42.

In an alternative embodiment, the base body 22 can rest against the fastening portion 24 via its inner side 30, but in all embodiments the inner side 30 is only firmly connected to the fastening portion 24 via the adhesive strip 36.

To fasten the sealing profile 20 to the holding rail 14, the sealing profile 20 has an assembly aid strip 44 which is attached to the fastening portion 24 on the side opposite the base body 22.

The assembly aid strip 44 is, for example, a double-sided adhesive tape with masking paper, which protects the adhesive tape until assembly and is peeled off before assembly.

In the assembled state, the base body 22 is arranged compressed in the vertical direction V in the edge joint 16. In this case, the fastening portion 24 forms a sealing web which seals an intermediate space between the holding rail 14 and the cladding 12.

Because the base body 22 is only fastened to the fastening portion 24 at the bottom, the upper base body 22 can be resiliently deformed particularly well in the vertical direction V, as a result of which its vertical height can vary over a particularly large range, depending on the load.

In this way, the sealing profile 20 reliably seals the edge joint 16 as long as the joint width is provided within the comparatively wide range for which the sealing profile 20 is intended.

The region for which the sealing profile 20 is provided is in particular ¼" (0.635 cm) to ¾" (1.905 cm). This means that the base body 22 is configured to reliably seal joint widths of ¼" (0.635 cm) to ¾" (1.905 cm) and for this purpose has a vertical height B of at least 2 cm, for example.

A sealing profile 20 according to a further embodiment will now be described with reference to FIG. 2. The same reference signs are used for the components which are known from the above embodiment and in this respect reference is made to the preceding explanations.

In contrast to the embodiment shown in FIG. 1, the fastening portion 24 extends in the unloaded state of the sealing profile 20 in the vertical direction V by the height b beyond the upper side 28 of the base body 22. In other words, the end 34 terminates at a vertical height that is above the upper side 28. This also means that the vertical height of the base body 22 is smaller by the height b than the height B of the fastening portion 24. As a result, the sealing profile 20 has a step-shaped cross section or a stepped profile, in which the base body 22 and the fastening portion 24 each form a step with a different vertical height.

To produce the aforementioned sealing profiles 20, a method is provided which is explained below with reference to FIGS. 3 to 8. The production of the embodiment shown in FIG. 1 takes place according to the steps shown in FIGS. 4 to 7, while the embodiment shown in FIG. 2 takes place according to the steps shown in FIGS. 4 to 6 and 8.

In the method, a plurality of sealing profiles 20 is produced in parallel, FIGS. 4 to 8 show the production of ten sealing profiles 20, the strip-shaped sealing profiles 20 or sealing profile blanks being machined simultaneously in each step.

In principle, any number of sealing profiles 20 can be produced in parallel with the method, but preferably at least 5.

FIG. 3 shows a production line 50 with a first roll 52, an adhesive device 54, a second roll 56, an application device 58, and a cutting device 60, which are arranged one behind the other in the longitudinal direction Z according to the production steps.

In this case, the first roll 52 provides a first web 62 which forms the base bodies 22 of the sealing profiles 20 and is accordingly formed from the same sealing material as this.

Furthermore, the first web 62 has a thickness in the Y direction that corresponds to the thickness D of the base body 22.

The second roll 56 provides a second web 64 which forms the fastening portions 24 of the sealing profiles 20 and is accordingly formed from the same material as this.

Furthermore, the second web 64 has a thickness in the Y direction that corresponds to the thickness d of the fastening portion 24.

The first web 62 and the second web 64 are therefore each roll goods.

In a first step, the first web 62 is provided.

In a subsequent step, the adhesive device 54 is used to apply a number of adhesive strips 36 (see FIG. 4) to the first web 62, which corresponds to the number of sealing profiles 20 to be produced.

The adhesive strips 36 are in this case applied parallel to one another, in the longitudinal direction Z and in each case on a sealing profile 20 assigned thereto.

Figure 7:
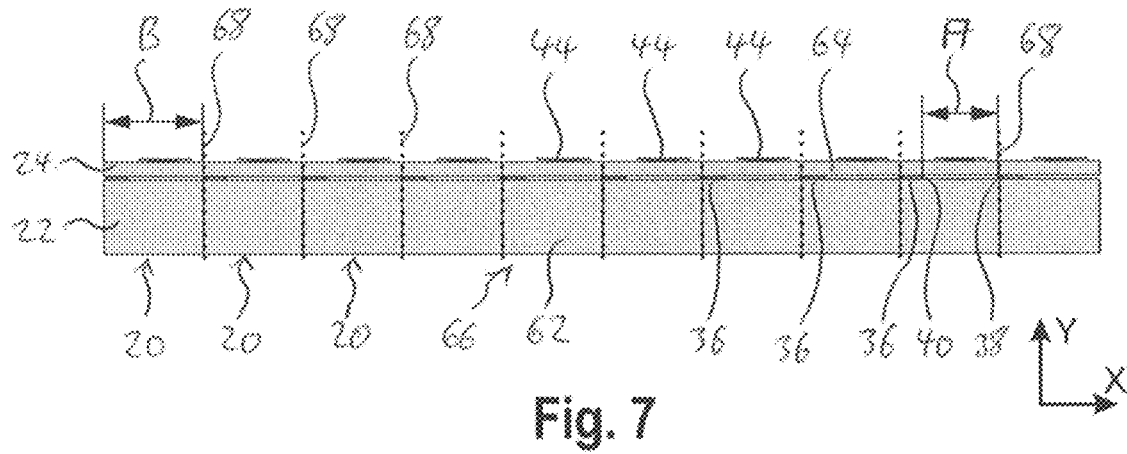
FIG. 7 is a schematic sectional view of an individual step of the method from FIG. 3.
Figure 8:
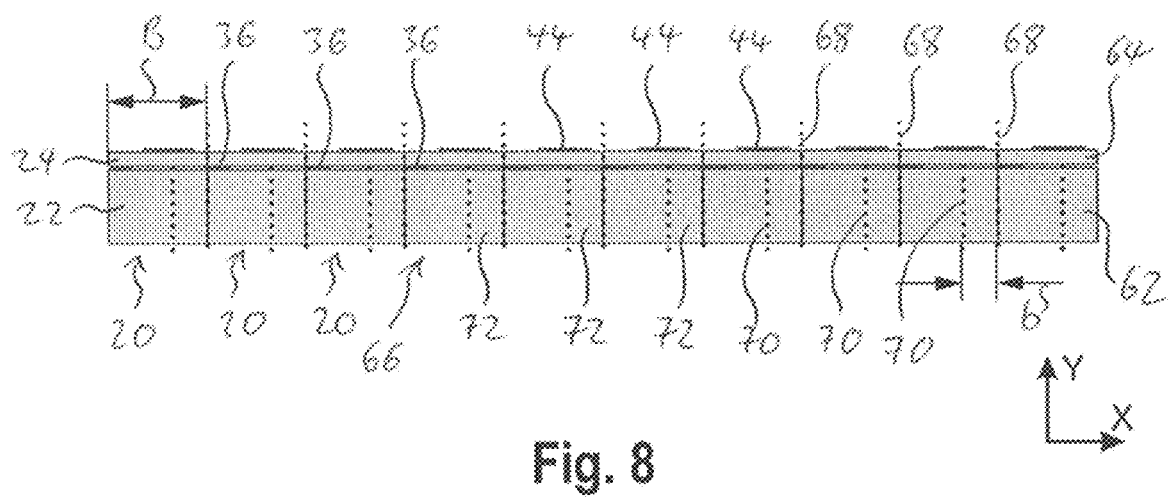
FIG. 8 is a schematic sectional view of an individual step of the method from FIG. 3.

The distance E in the X direction between two adjacent adhesive strips 36, i.e. between the upper end 40 of one adhesive strip 36 and the opposite lower end 38 of the adjacent adhesive strip 36, corresponds to 80% of the height B of a sealing profile 20 (see FIG. 7).

In an alternative embodiment, the distance E can correspond to at least 50% of the height B of a sealing profile 20.

In a further step, the provided second web 64 is brought together with the first web 62 and bonded to form a multilayer web 66 (see FIG. 5) by means of the adhesive strips 36.

They are brought together and connected, for example, by means of a device with rollers.

Subsequently, by means of the application device 58, a number of assembly aid strips 44 (see FIG. 6) opposite to the first web 62 are applied to the second web 62, which corresponds to the number of sealing profiles 20 to be produced.

The assembly aid strips 44 are applied parallel to one another, in the longitudinal direction Z and on a sealing profile 20 assigned to them.

In an alternative embodiment, instead of the individual assembly aid strips 44, a coherent assembly aid layer is applied, which is severed into corresponding assembly aid strips 44 in a subsequent step, in particular by means of the first cuts 68 described below.

In a subsequent step, a plurality of first cuts 68 (see FIG. 7) are made in the longitudinal direction Z by means of the cutting device 60 and each cut through the multilayer web 66 in the Y direction.

The first cuts 68 each separate two sealing profiles 20 from one another. This means that the number of first cuts 68 is one less than the number of sealing profiles 20 that are produced in parallel, i.e. nine in the present embodiment.

In an alternative embodiment, a further cut can be provided at one or both outer ends in the X direction of the multilayer web 66 in order to cut the ends to length in a defined manner. In particular in the case in which the first web 62 and/or the second web 64 are wider in the X direction than the total of the sealing profiles 20 produced in parallel.

Adjacent first cuts 68 each have a distance B which corresponds to the height B (see FIG. 1) of the sealing profile 20, which is delimited by the two adjacent first cuts 68.

Each first cut 68 is also arranged between the adhesive strips 36 of the two adjacent sealing profiles 20, i.e. at a distance from these.

In this case, each first cut 68 is at a distance A from the upper end 40 of the one adhesive strip 36, which distance corresponds to the distance A (see FIG. 1) of the adhesive strip 36 in the vertical direction V to the end 34 of the fastening portion 24 of the one sealing profile 20, and which distance corresponds, in the present embodiment, to approximately 75% of the height B of the base body 22.

Furthermore, each first cut 68 is at a distance from the lower end 38 of the other adhesive strip 36, which distance corresponds to the distance a (see FIG. 1) of the adhesive strip 36 in the vertical direction V to the underside 26 of the base body 22 of the other sealing profile 20 and which distance corresponds, in the present embodiment, to approximately 5% of the height B of the base body 22.

In an alternative embodiment, the first cut 68 can have the smallest distance A from an adjacent adhesive strip 36, which distance corresponds to at least 50% of the height B of the sealing profile 20.

Additionally or alternatively, the first cut 68 can have the smallest distance to the other adjacent adhesive strip 36, which distance corresponds to at most 20% of the height of the sealing profile 20.

In order to produce the step-shaped sealing profiles 20 shown in FIG. 2, in addition to the first cuts 68 by means of the cutting device 60, a plurality of second cuts 70 (see FIG. 8) are introduced in the longitudinal direction Z, which cut through the first web 62 in the Y direction.

However, the second cuts 70 do not extend into the second web 64 and thus leave it untouched.

Every second cut 70 is arranged between the adhesive strip 36 of the assigned sealing profile 20 and the first cut 68 or the outer end of the multilayer web 66, which cut or end is provided at a distance A from the corresponding adhesive strip 36.

In this case, every second cut 70 is at a distance b from the assigned first cut 68 or outer end of the multilayer web 66, which distance corresponds to the height b (see FIG. 2) beyond which the fastening portion 24 extends in the unloaded state of the sealing profile 20 in the vertical direction V beyond the upper side 28 of the base body 22.

The second cuts 70 are preferably made before or together with the first cuts 68.

The cutouts 72 formed by the first and second cuts 68, 70 can be removed in a subsequent step.

In all embodiments, the sealing profiles 20 designed in this way can be cut off in a specific length in the longitudinal direction Z and wound up to form rolls 74 (see FIG. 3) in a space-saving manner.

In an alternative embodiment, the multilayer web 66 can be rolled up into a primary roll before the first cuts 68 are introduced in a later step, for example by cutting rolls 74 each with a sealing profile 20 from the primary roll.

In a further alternative embodiment, the first and/or the second web 62, 64 can be provided in the form of plates instead of roll goods, which are connected to one another in accordance with the aforementioned method and processed further to form a plurality of sealing profiles 20.

In this way, a method is provided by means of which sealing profiles 20 of complex design can be produced with little effort.

The invention is not limited to the embodiments shown. In particular, individual features of one embodiment can be combined in any way with features of other embodiments, in particular independently of the other features of the corresponding embodiments.

The invention claimed is:

1. A method for producing a plurality of strip-shaped sealing profiles for an edge joint which is formed between a floor and adjacent cladding of drywall, the method comprising:
   a) providing a first web of sealing material,
   b) applying a plurality of adhesive strips to the first web, wherein adhesive strips of the plurality of adhesive strips each extend in a first direction of the first web, and
   wherein adjacent adhesive strips of the plurality of adhesive strips of two adjacent sealing profiles of the plurality of sealing profiles are at a distance from one another in a second direction perpendicular to the first direction, wherein the distance corresponds to at least 50% of a height of a sealing profile of the plurality of sealing profiles,
   c) providing a second web,
   d) merging and joining the first web to the second web via the plurality of adhesive strips to form a multilayer web, and
   e) introducing a plurality of first cuts in the first direction in the multilayer web at a second distance from the plurality of adhesive strips to form the plurality of sealing profiles,
   wherein each cut of the plurality of first cuts separates two adjacent sealing profiles of the plurality of sealing profiles from one another,
   wherein each cut of the plurality of first cuts is at a first smallest distance from the lower end of an adhesive strip of one of the two adjacent sealing profiles, the first smallest distance corresponding to at most 20% of the height of the sealing profile, and
   wherein each cut of the plurality of first cuts is at a second smallest distance from the upper end of an adjacent adhesive strip of the other of the two adjacent sealing profiles, the second smallest distance corresponding to at least 50% of the height of the sealing profile perpendicular to the first direction; and f) introducing a further plurality of second cuts in the first direction in the first web, to form a stepped profile on the plurality of sealing profiles.

2. The method according to claim 1, wherein the following is carried out before e):

g) applying a plurality of assembly aid strips to the second web, wherein assembly aid strips of the plurality of assembly aid strips are arranged opposite to the first web and each extend in the first direction of the second web, and wherein each adhesive strip of the plurality of adhesive strips is assigned an assembly aid strip of the plurality of assembly aid strips.

3. The method according to claim 1, wherein the following is carried out before e):

h) applying an assembly aid layer to the second web, wherein the assembly aid layer is arranged opposite to the first web, and, after introducing the plurality of cuts in e), the assembly aid layer forms a plurality of assembly aid strips, each of which extend in the first direction of the second web and are assigned to a sealing profiles of the plurality of sealing profiles.

4. The method according to claim 1, wherein in f) the further plurality of cuts extend completely through the first web, but not in or through the second web.

5. The method according to claim 1, wherein f) is carried out before or together with e).

6. The method according to claim 1, wherein the first web and/or the second web are/is roll goods.

7. The method according to claim 1, wherein the sealing material of the first web is a foam.

8. The method according to claim 1, wherein the second web is formed from a plastic material or a foam.

9. The method according to claim 1, wherein each sealing profile of the plurality of sealing profiles has exactly one adhesive strip.

10. The method according to claim 1, wherein the first web and the second web are each plate-shaped with a constant thickness.

11. The method according to claim 1, wherein the first web has a thickness that is at least 3 times greater than a thickness of the second web.

12. The method according to claim 7, wherein the foam is an open-cell foam or at least partially open-cell foam.

13. The method according to claim 8, wherein the foam is a closed-cell foam.

14. A sealing profile, produced by the method according to claim 1.

* * * * *